Feb. 27, 1940.  E. E. WESSOCK  2,191,601
FASTENER FOR GRASS CATCHING BASKETS FOR LAWN MOWERS
Filed July 12, 1939
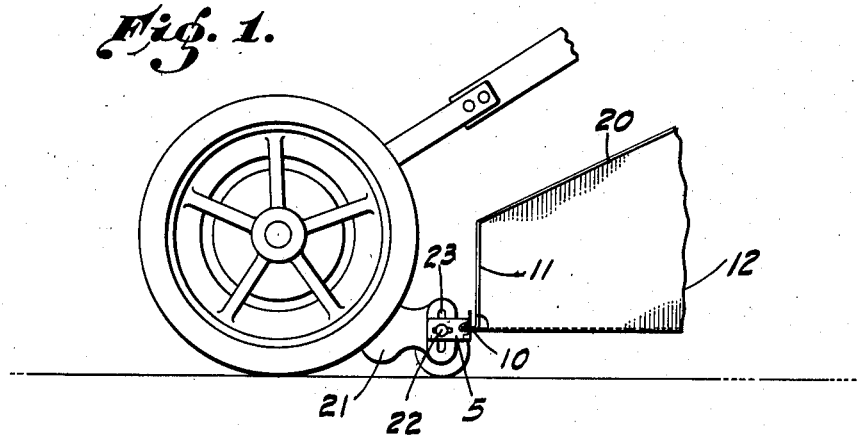
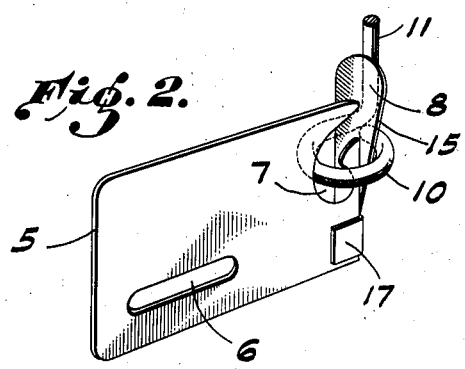
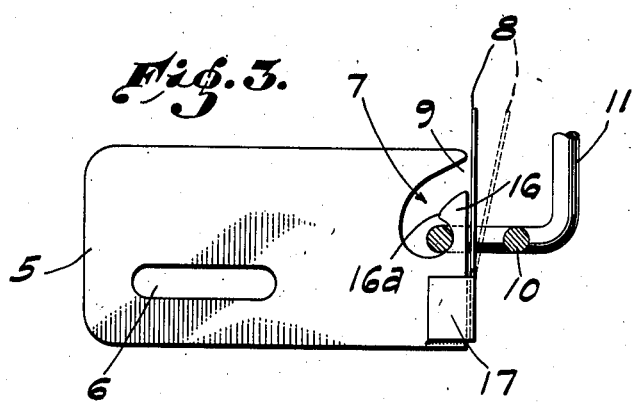 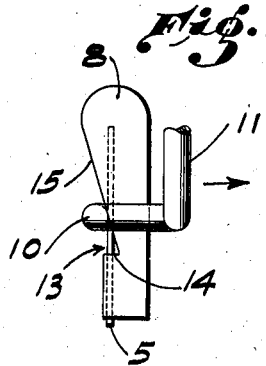
ERNEST E. WESSOCK,
INVENTOR.
BY
ATTORNEY.

Patented Feb. 27, 1940

2,191,601

UNITED STATES PATENT OFFICE 2,191,601

FASTENER FOR GRASS CATCHING BASKETS FOR LAWN MOWERS

Ernest E. Wessock, Los Angeles, Calif.

Application July 12, 1939, Serial No. 284,057

6 Claims. (Cl. 24—241)

The present invention relates to improvements in fasteners for attaching a grass catching basket to a lawn mower.

One of the important objects of the invention is to provide an improved fastener for lawn mowers whereby the grass catcher may be more easily attached therewith and detached therefrom, and when once attached, it being positively assured the connection will remain unbroken irrespective of which direction the mower is travelling or over what inclinations of ground.

Another object of the invention is to provide an improved article of manufacture for the purpose above stated, applicable to different types of lawn mowers, said article being inexpensive to manufacture and more effective in use.

Still further objects, features, and advantages of invention will hereinafter appear.

Referring to the drawing wherein is shown a preferred embodiment of the invention now under demonstration:

Fig. 1 is a side elevation showing a part of a lawn mower and the front end of the grass catching basket connected thereto by means of my improved fastener, Fig. 2 is a perspective view, a portion of the grass catcher connecting means being included in the view, Fig. 3 is a side elevation of the parts shown in Fig. 2, and Fig. 4 is an end elevation of the structure shown in Fig. 3.

It is not infrequent that while using many of the different fasteners now in use for lawn mower grass catchers, the grass catchers become detached necessitating the stopping of the mowing operation to re-establish the connection, thus greatly impeding the progress of the work.

Especially is this noticable in fasteners having open ended slots, when the lawn mower is being operated on hillside lots and slanting terraces.

The objections found in most of the present day fasteners have been overcome by the use of my improved fastener and spring retaining clip.

Refering now in detail to the drawing and first particularly to the device per se shown in Figs. 2 to 4, the invention comprises a bracket 5 provided with an elongated aperture 6 near one end, and an open ended hook slot 7 extending downwardly and rearwardly from a point adjacent the upper edge in the edge of the bracket at the other end thereof.

I provide a clip 8 for enclosing the opening 9 along the edge of the bracket, said clip being one of a pair and constructed of a yieldable material to permit it being manually deflected as dottedly indicated in Fig. 3. When so deflected, the horizontal loops 10 of the members 11 of the basket 12 may be fed into and out of said slot. Said clip is formed as an upstanding wing having a notch 13 cut into one edge of its lower portion thus providing a shoulder 14 at the lower end of the inclined straight edge 15 of the wing. By thus constructing the wing, it is widened throughout its upper portion and therefore the inclined straight edge 15 cooperates with the hook 16 to prevent the loop 10 from moving upwardly out of its seat.

The wing 8 is provided with a laterally extending flange 17 which is welded or otherwise secured to the rear part of the bracket 5 at a point below the hook-forming slot 7.

The members or arms 11 which carry the loops 10, form a part of the frame 20 of the usual grass catching basket 12, said frame having a resiliency which tends to move said arms and loops nearer to each other when said loops are in their operative, attached relation to the brackets 5. The wing edges 15 are directed away from the midwidth of the swath being cut by the mower and therefore contact with and to some extent overhang the outer portions of the loops 10 when said loops occupy the basal portions of the hook-forming slots 7. For this reason, said wing edges 15 and the shoulder portion 16a of the hook 16 simultaneously obstruct upward movement of each loop 10 toward an unattached position. Said wing edges 15 exert their keeping function upon the attached loops 10 at all times, whether a backward or a forward movement is given to the mower and also irrespective of whether the ground being mowed is level or of a rolling character.

The brackets 5 are attached to the rear extensions 21 of the mower by means of the conventional bolts 22 which are each adjusted to the desired part of the extension slot 23 and at the same time, before the nuts for said bolts are screwed down, each bracket 5 is adjusted to bring the desired portion of its slot 6 in alinement with the bolt. When the nuts are screwed down upon said bolts the bracket plates 5 will be positioned properly to trail the attached grass catcher 12.

In attaching the grass catcher, the loops 10 will be placed into the base portions of the hook forming slots 7 in the usual manner, except that the upper portion of each wing 8 will be sprung away from the mouth of the slot 9, as indicated by dotted lines in Fig. 3, in order to provide a clearance for the downward movement of the loop into the slot.

It should be understood that the present disclosure is for the purpose of illustration only and that this invention includes all modifications and equivalents which fall within the scope of the subject matter claimed.

What is claimed is:

1. In a device of the kind described, an upstanding plate which extends in the direction of the travel of a lawn mower and is attachable to each side of the rear portion thereof, said plate having a hook-forming slot cut into its rear edge at a downward inclination, and an upstanding resilient wing having a basal portion attached to said plate below the hook formed by said slot, said wing constituting a yielding keeper to normally retain in place the attached portion of the grass carrier.

2. The subject matter of claim 1 and, said wing widening toward its top thus providing it with an inclined side edge, said edge being positioned to cooperate with said hook portion to obstruct against upward dislocation the part of the grass catcher occupying said slot.

3. As an article of manufacture, a bracket for trailing a grass catcher, said bracket consisting of a substantially rectangular flat plate having through one of its end portions an aperture to receive attaching means and having cut into the edge of its opposite end portion a downwardly extending hook-forming slot, and an upstanding wing having a flat body portion positioned normally to close the mouth of said slot, said wing having a flange extending laterally from its base portion at a right angle to the plane of its body, said flange being secured in a flatwise manner to said bracket.

4. The subject matter of claim 3 and, said body portion of said wing having upwardly directed side edge portions one of which is inclined in a direction to widen the upper portion of said wing, said inclined edge being positioned to perform a retaining function in relation to a part occupying said slot.

5. In a device of the kind described, an upstanding plate which extends in the direction of the travel of a lawn mower and is attachable to each side of the rear portion thereof, said plate having a hook-forming slot cut into its rear edge at a downward inclination, and an upstanding resilient wing having a basal portion attached to said plate below the hook formed by said slot, said wing constituting a yielding keeper to normally retain in place the attached portion of the grass carrier, said wing having a flat face which is directed toward the mouth of said slot, said wing widening toward its top thus providing it with an inclined side edge, said edge being positioned to cooperate with said hook portion to obstruct against upward dislocation the part of the grass catcher occupying said slot.

6. In a device of the kind described, an upstanding plate which extends in the direction of the travel of a lawn mower, and is attachable to each side of the rear portion thereof, said plate having a hook-forming slot cut into its rear edge at a downward inclination, and an upstanding resilient wing having a basal portion attached to said plate below the hook formed by said slot and having a deflectable upper portion extending above the top edge of said plate, said deflectable portion being contactable by the attached portion of the grass catcher incident to the latter's application, whereby to manually deflect said wing, said wing constituting a yielding keeper to normally retain in place said attached portion of the grass carrier.

ERNEST E. WESSOCK.